Patented June 15, 1948

2,443,270

UNITED STATES PATENT OFFICE 2,443,270

PREPARATION OF MONOSULFONES OF CONJUGATED DIOLEFINS

Richard F. Robey, Cranford, and Charles E. Morrell, Roselle, N. J., assignors to Standard Oil Development Company, a corporation of Delaware No Drawing. Application September 30, 1943, Serial No. 504,380

8 Claims. (Cl. 260—329)

This invention relates to the concentration of butadiene homologs and relates particularly to the separation and concentration of butadiene, isoprene, piperylene, 2,3-dimethyl butadiene, etc.

The use of sulfur dioxide for separating diolefins from hydrocarbon mixtures containing olefins and diolefins is well known but the difficulties heretofore encountered were that the diolefins also tended to form polymers as indicated by the appearance during the course of the reaction of a curdy white precipitate as in the case of isoprene. This polymer is insoluble in most organic solvents and water. Attempts have been made in the past to avoid the formation of the polymers, first by the use of anti-oxidants such as hydroxy-benzene compounds, for example, phenol, pyrogallol, resorcinol, etc. The use of such anti-oxidants did materially reduce the formation of polymers but there were still substantial losses of diolefins and fouling of equipment by the formation of such polymers. Another method known in the older art for reducing the formation of polymers involves decreasing the amount of sulfur dioxide used to react with the diolefins, that is, successively treating hydrocarbon mixtures containing diolefins with small amounts of sulfur dioxide. This procedure rendered the process of separating diolefins very tedious and expensive to operate.

An object of this invention is to provide a process in which diolefins may be readily and commercially separated from hydrocarbon mixtures containing olefins and diolefins.

Another object of this invention is to provide a method in which individual diolefins may be individually separated from a hydrocarbon mixture containing olefins and diolefins.

Still another object of this invention is to provide a method in which the losses resulting from the formation of polymers and the attendant fouling of equipment when sulfur dioxide is used in the separation of diolefins from hydrocarbon mixtures containing olefins and diolefins are substantially eliminated.

According to this invention the sulfur dioxide and hydrocarbon mixture containing diolefins are first treated with an oxidation inhibitor or peroxide-destroying material such as alpha-naphthol, pyrogallol, cresol, phenol, tertiary butyl catechol, etc. The sulfur dioxide and hydrocarbon mixture are treated separately with the oxidation inhibitor and heated to a temperature of 100° C. for a period of about one hour. The treated sulfur dioxide is then used to separate the diolefin from the treated hydrocarbon mixture. Alternatively, the reactants sulfur dioxide and the hydrocarbon mixture may be treated separately by distilling in an oxygen-free atmosphere to remove the polymer-forming bodies.

The hydrocarbon mixture that was treated first with the oxidation inhibitor may be contacted with any amounts of sulfur dioxide to separate the diolefins and thereby substantially all of the diolefins may be separated from the hydrocarbon mixture containing the olefin and diolefin in one reaction vessel. The use of a solvent medium for the reaction was likewise found to be advantageous, for example, benzol, toluol, xylol, etc. The residual oxidation inhibitor may be allowed to remain in the reaction mixture to eliminate any side reactions and therefore to increase the yields of desired products. Therefore, the steps involved in the concentration of diolefins are (a) the separate pretreating of either one or both the hydrocarbon mixture containing one or more butadienes and the sulfur dioxide, (b) thereafter reacting the two to form the corresponding monosulfones, (c) the removal of the unreacted hydrocarbons and sulfur dioxide, (d) decomposition of the monosulfone compound by heating at an elevated temperature ranging from 120° to 150° C., at atmospheric pressure or higher at elevated pressures, (e) collecting the mixtures of diolefins and sulfur dioxide and (f) separation of sulfur dioxide and diolefins.

The polymer-forming reaction is very sensitive to the amount of the inhibitor added, as illustrated by the observations presented in the following table for the reaction of isoprene fraction (68% $C_5H_8$) with $SO_2$ in acetone solution at room temperature.

Formation of poly-isoprene sulfones in acetone solution

| Run | Inhibitor Added | To | Time for First Appearance of Polymer Precipitate |
|---|---|---|---|
| 1 | None | | Immediately. |
| 2 | 1% Pyrogallol | Only to acetone-$SO_2$ soln., before mixing with isoprene. | 1 Hr. |
| 3 | do | Separately to acetone-$SO_2$ soln. and to isoprene before mixing. | 1-2 Days. |

The inhibitor should be added to crude isoprene in sufficient quantity and prior to mixing. It is believed that these conditions are necessary to give the antioxidant opportunity to deactivate the bodies which induce polymerization.

When a weight of SO₂ equal to the total weight of hydrocarbon (C₅ fraction and benzene as solvent were used) was used a 24% conversion of the diolefin to polysulfone, even in the presence of 1% of inhibitor, was obtained. The formation of polysulfones has been avoided by using smaller proportions of sulfur dioxide, that is, less than one-half the weight of the hydrocarbon, but the disadvantage in doing so was that the process became very detailed and uneconomical to operate due to low percentages of diolefin reacted. It has been found that if the diolefin fraction and sulfur dioxide were separately distilled in an atmosphere of unpurified commercial hydrogen and with pyrogallol in both the still pot and receiver and the purified materials then placed immediately in a bomb in the absence of air and permitted to react with sulfur dioxide in tenfold molar excess over the diolefin at 50° C., no polysulfone was formed and a 60% conversion of diene to monosulfone was obtained in two hours as compared to less than 15% in previous experiments without foresaid pretreatment where the concentration of sulfur dioxide was limited to avoid polymerization difficulties. Both experiments were carried out in the presence of 0.2% concentration of pyrogallol inhibitor. The initial weight of sulfur dioxide employed was 160% that of the total hydrocarbon charge.

EXAMPLE 1

This invention is illustrated by the following table of data for experiments in which a piperylene fraction was reacted with SO₂ at 50° C.:

fone was obtained as a residual crystalline mass in the bomb, weight 130 g. (1 mole isoprene sulfone=132 g.).

Total input 404 g.; accounted for 403 g.

In reacting diolefins with sulfur dioxide, it was found that piperylene forms a compound that is liquid at ordinary temperatures while isoprene forms a compound that is a solid, melting at 63.5° C. and these two compounds, therefore, the piperylene and the isoprene, may readily be separated by decantation and/or filtration, etc.

The decomposition temperatures of isoprene and piperylene monosulfones at atmospheric pressure were found to be different. Piperylene sulfone dissociates quite rapidly at a temperature of 100° C., while isoprene sulfone does so only at 120° C. This may be used to separate the two diolefins. For example, a hydrocarbon mixture containing 56 parts of isoprene, 57 parts of piperylene and 7 parts of cyclopentadiene in a benzene solution is reacted with sulfur dioxide after pretreatment in the presence of .1% of an antioxidant pyrogallol at 100° C. At the end of one hour most of the isoprene had reacted but little of the piperylene. The isoprene sulfone can be then removed and the isoprene regenerated and the piperylene fraction submitted to further treatment with sulfur dioxide under milder conditions whereby it will form a monosulfone which may be decomposed to obtain a substantially pure diolefin on heating. This method can be used not only to separate the two diolefins but also to concentrate them.

*Reaction of piperylene with sulfur dioxide to form monosulfones in benzene solution*

| Pretreatment Other Than Addition of Inhibitor | Initial Conc. in Moles/Liter | | Time, Hours | Per cent Diene Reacted | Remarks |
|---|---|---|---|---|---|
| | Total Diene | Sulfur Dioxide | | | |
| None | 2.49 | 2.75 | 2.0 / 4.0 | 10.2 / 14.4 | 8% of diolefin converted to polysulfones. |
| Redistilled in atm. of hydrogen; SO₂ also redistilled | 1.36 | 13.7 | 2.0 / 4.0 | 56.7 / 61.8 | No polysulfone formed. |

It has been found that the polymerization-inducing constituents may be removed or readily deactivated by heating the hydrocarbon fraction containing a diene with 1% of an antioxidant such as pyrogallol at 100° C. for one hour, which fraction, when contacted with a ten-fold molar excess of sulfur dioxide over diolefin at 100° C., gave virtually complete reaction to the monosulfone in 1 hour or less with no evidence of polysulfone formation.

EXAMPLE 2

One mole of isoprene contained in 148 grams of a C₅ fraction containing about 46.0 weight percent of the diolefin was placed in a bomb together with the usual quantity of pyrogallol, and heated at 100° C. for one hour.

After the preheating step, the bomb was cooled and opened. Four moles of liquid sulfur dioxide (256 g.) were then added, the bomb resealed, and again heated at 100° C. for one hour. No diluent other than the non-diolefinic C₅ hydrocarbons was present. While the bomb was still warm, the volatile material was allowed to flash off and collect in cold traps. A quantity of mixed C₅ hydrocarbons and sulfur dioxide amounting to 273 grams was collected. The isoprene sul-

We claim:

1. In a process for the preparation of sulfones by reacting sulfur dioxide with a hydrocarbon mixture containing conjugated diolefin, which mixture tends to form polymer upon being reacted with said sulfur dioxide, the steps which comprise first adding an oxidation inhibitor to said hydrocarbon mixture, heating said hydrocarbon mixture containing said added oxidation inhibitor to substantially eliminate impurities which cause said tendency to form polymer and thereafter adding said sulfur dioxide to said mixture and reacting said sulfur dioxide with said conjugated diolefin to form a monosulfone without substantial formation of polymer.

2. In a process for the preparation of sulfones by reacting sulfur dioxide with a hydrocarbon mixture containing conjugated diolefin, which mixture tends to form polymer upon being reacted with said sulfur dioxide, the steps which comprise separately adding an oxidation inhibitor to said hydrocarbon mixture and to said sulfur dioxide, heating said hydrocarbon mixture containing said added oxidation inhibitor to substantially eliminate impurities which cause said tendency to form polymer and thereafter combining said inhibited hydrocarbon mixture and sulfur dioxide and reacting said sulfur dioxide with said conjugated diolefin to form a monosulfone without substantial formation of polymer.

3. A process for the preparation of sulfones by reacting sulfur dioxide with a hydrocarbon mixture containing conjugated diolefin, which mixture tends to form polymers upon being reacted with said sulfur dioxide, which comprise the steps of adding to said hydrocarbon mixture an inhibitor which suppresses oxidation and consequent polymerization, heating said hydrocarbon mixture containing said added oxidation inhibitor to substantially eliminate impurities which cause said tendency to form polymer separately adding to said sulfur dioxide the same inhibitor, thereafter combining said inhibited hydrocarbon mixture and said sulfur dioxide and reacting said sulfur dioxide with said conjugated diolefin in said mixture without substantial formation of polymer.

4. A process according to claim 3 wherein said inhibitor is pyrogallol.

5. A process of separating diolefins according to claim 1 in which the proportion of sulfur dioxide used is in excess of one-half the weight of hydrocarbon treated.

6. A process of separating diolefins according to claim 1 in which the hydrocarbon mixture is dissolved in an organic solvent before reacting with sulphur dioxide.

7. A process of separating diolefins according to claim 2 in which the hydrocarbon mixture is dissolved in an organic solvent.

8. A process of separating a diolefin from a hydrocarbon mixture according to claim 1 in which at least 1% of an inhibitor used in suppressing oxidation and consequent polymerization is added based on the weight of said hydrocarbon mixture.

RICHARD F. ROBEY.
CHARLES E. MORRELL.

REFERENCES CITED

The following references are of record in the file of this patent:

UNITED STATES PATENTS

| Number | Name | Date |
|---|---|---|
| 1,196,259 | Matthews et al. | Aug. 29, 1916 |
| 2,271,092 | Perkins et al. | Jan. 27, 1942 |
| 2,326,440 | Craig | Aug. 10, 1943 |
| 2,356,840 | Frey et al. | Aug. 26, 1944 |
| 2,373,329 | Morris et al. | Apr. 10, 1945 |

FOREIGN PATENTS

| Number | Country | Date |
|---|---|---|
| 361,341 | Great Britain | Nov. 16, 1931 |

OTHER REFERENCES

Yamada, Chem. Abs., vol. 27, 3661 (1933) in Patent Office Library.

Scott, Jour. Ind. Eng. Chem. News. Ed., vol. 18, No. 9, 404 (1940).

Staudinger et al., Berichte, vol. 68, 455–471 (1935).